Figure 1:
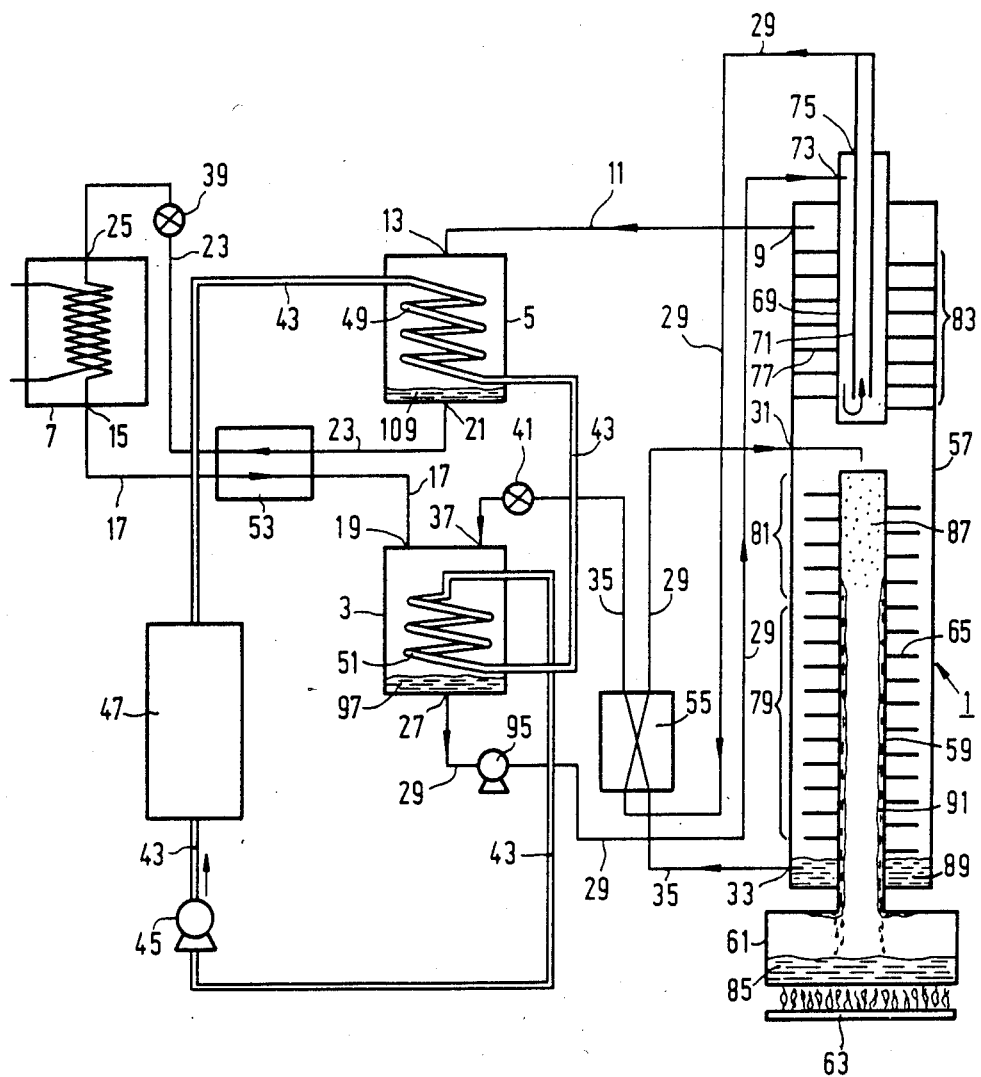

United States Patent [19]
van der Sluys et al.

[11] Patent Number: 4,573,330
[45] Date of Patent: Mar. 4, 1986

[54] ABSORPTION HEAT PUMP COMPRISING AN INTEGRATED GENERATOR AND RECTIFIER

[75] Inventors: Willem L. N. van der Sluys; Jacobus Pastoor; Johannus C. M. Roelofs, all of Eindhoven, Netherlands

[73] Assignee: U.S. Philips Corporation, New York, N.Y.

[21] Appl. No.: 728,436

[22] Filed: Apr. 29, 1985

[30] Foreign Application Priority Data

Oct. 30, 1984 [NL] Netherlands ............... 8403281

[51] Int. Cl.$^4$ .............................................. F25B 15/00
[52] U.S. Cl. .......................................... 62/476; 62/495; 62/497
[58] Field of Search .............. 62/495, 496, 476, 494, 62/497

[56] References Cited

U.S. PATENT DOCUMENTS

| 2,241,621 | 5/1941 | Shoeld | 62/497 X |
| 3,254,507 | 6/1966 | Whitlow | 62/476 |
| 3,509,732 | 5/1970 | Roeder, Jr. | 62/476 |
| 3,750,421 | 8/1973 | Merrick | 62/497 X |
| 4,106,309 | 8/1978 | Phillips | 62/476 |
| 4,291,545 | 9/1981 | Worsham, III | 62/476 X |

Primary Examiner—Lloyd L. King
Attorney, Agent, or Firm—Rolf E. Schneider

[57] ABSTRACT

An absorption heat pump comprising a generator which is provided with a condensation pipe (59) comprising a lower generating section (79) and an adjoining upper rectifying section (81). The upper section (81) is filled with a thermally insulating gas (87) which separates the generating section (79) from the rectifying section (81). Thus, a simple construction is obtained, in which the rectifier is integrated in the generator.

4 Claims, 5 Drawing Figures

ABSORPTION HEAT PUMP COMPRISING AN INTEGRATED GENERATOR AND RECTIFIER

The invention relates to an absorption heat pump comprising a generator and absorber arranged in a first circuit for a solution of work medium and solvent and a condenser and evaporator arranged in a second circuit for the work medium, an outlet of the generator being connected to the condenser and an outlet of the evaporator being connected to the absorber, which is connected via an outlet to an inlet of the generator, while a vertically arranged first metal pipe passed into a holder of the generator and closed at its upper end is connected at its lower end to a vessel arranged outside the holder and forming part of the generator, which vessel contains an evaporation and condensation medium, respectively, the space between the holder and the said first pipe being connected to a supply for the solution and to an outlet for gaseous work medium.

In an absorption heat pump of the kind mentioned already proposed in published European Patent Application No. 0,132,000 A1, the gaseous work medium formed in the holder is conducted directly to the condenser. This has the disadvantage that with the gaseous work medium gaseous solvent also reaches the condenser and is conducted from this condenser in the liquid state to the evaporator. The operation of the evaporator is adversely affected thereby. This is especially the case when ammonia is used as work medium and water is used as a solvent. It is otherwise known from inter alia the book "Handbuch der Kältetechnik", Volume VII, p. 338–340 of R. Plank (published in 1959) to use a socalled rectifier for removing the water vapour from the gas mixture of ammonia and water. In a rectifier comprising two separated subconstructions, the hot gas mixture is conducted through the comparatively cold liquid solution of ammonia and water, which originates from the absorber. The rectifier construction is complicated and leads to a comparatively expensive absorption heat pump, which is not very readily accessible for maintenance activities.

The invention has for its object to provide an absorption heat pump, in which the said disadvantages are avoided.

The invention is for this purpose characterized in that the first pipe is filled in an upper rectifying section with a thermally insulating gas and is wetted in a lower generating section adjoining the upper section on its inner wall with condensing work medium, while the pipe is provided both in the upper and in the lower section with at least one fin which is secured to the outer wall of the pipe and is arranged so as to be clear of the inner wall of the holder.

Due to the fact that the upper part of the first pipe is thermally separated from the lower part, the upper part automatically acts as a rectifier, while the lower part acts as a generator. The integration of rectifier and generator in one pipe body leads to a very simple construction, which can be mass-produced at low cost.

It should be noted that the magazine "Journal of Heat Transfer" of February 1973, p. 93–100 discloses a socalled heat pipe, in which a non-condensable inert gas is used for keeping the temperature on the evaporator side of the pipe constant. The inert gas forms a buffer which is compressed with an increase of the evaporator temperature and is expanded with a decrease of the evaporator temperature. The effective condenser surface area is thus enlarged and reduced, respectively, so that a larger and a smaller quantity of heat, respectively, is dissipated in dependence upon the evaporator temperature. The buffer of inert gas is not used, however, for obtaining an adiabatic zone in the pipe, which acts as a rectifier in an absorption heat pump.

A preferred embodiment of the absorption heat pump, in which also a so-called dephlegmator having constructional features analogous to those of the rectifier and generator is arranged in the holder, is further characterized in that the holder is provided with a finned second metal pipe, which is coaxial to the first pipe, said second pipe being arranged above the first pipe and being closed at its end facing the first pipe, said second pipe surrounding a coaxial third pipe which is in communication at its open lower end with a supply for a cooling medium and is connected at its open upper end passed through the closed upper end of the second pipe to an outlet for the cooling medium, while the space between the holder and the second pipe is connected near the upper end of the holder to the condenser.

A particular embodiment of the absorption heat pump having an optimum heat transfer between the condensing medium in the first pipe and the rich solution in the space between the first pipe and the holder is characterized in that the metal fin secured to the first pipe consists of a number of interconnected lamellae which are helically wound around the first pipe.

A very particular embodiment of the absorption heat pump having besides an optimum heat transfer also an optimum mass transfer, is further characterized in that the lamellae are provided with capillary passages, the adjacent lamellae of successive turns of the helical line formed overlapping each other in part, viewed in the circumferential direction of the first pipe, and the capillary passage located above the surface of an underlying lamella being in a shifted position with respect to the capillary passage of the said underlying lamella.

Figure 2:
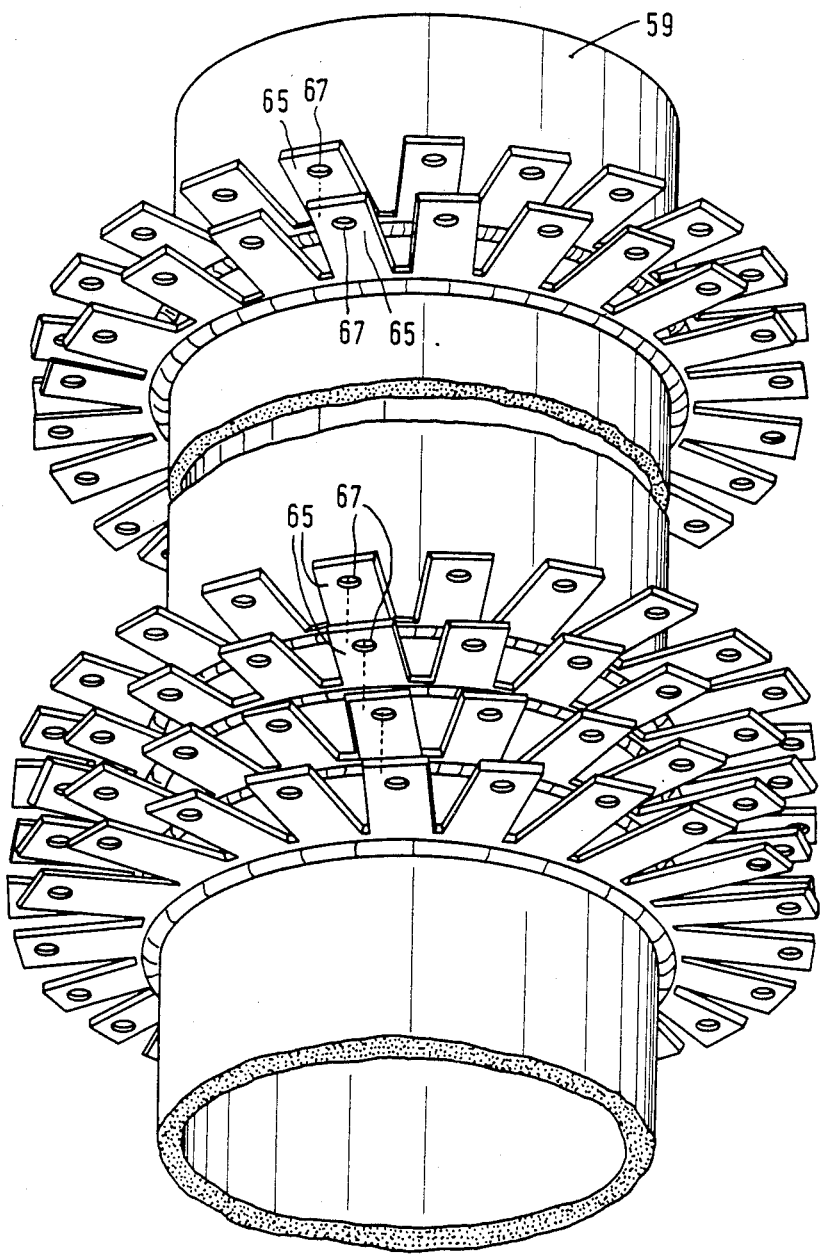
Figure 3:
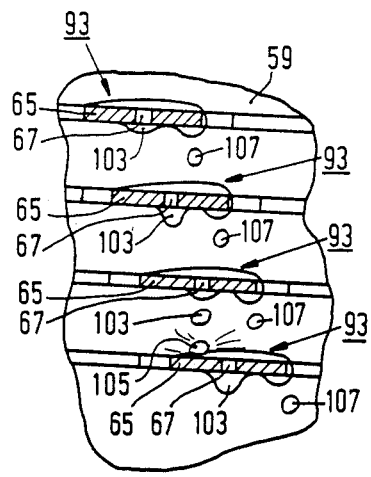
Figure 4:
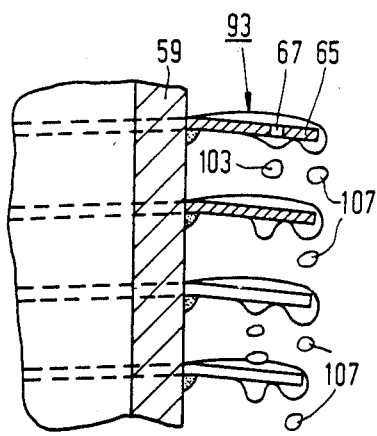
Figure 5:
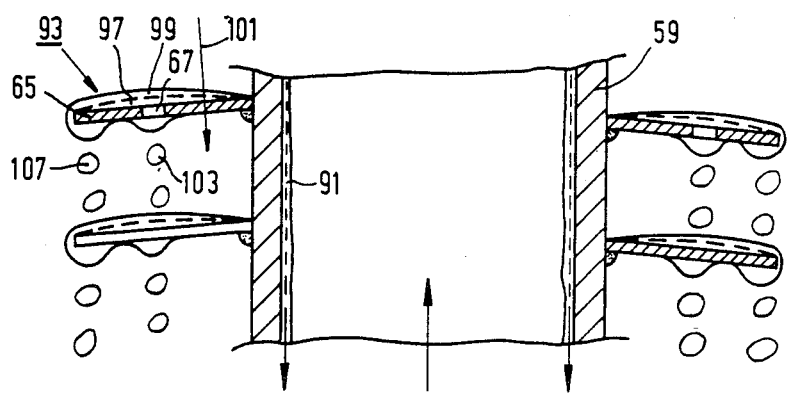

The invention will be described more fully with reference to the drawing, in which;

FIG. 1 shows diagrammatically a preferred embodiment of an absorption heat pump according to the invention, FIG. 2 shows a finned pipe used as an integrated generator/rectifier in the absorption heat pump shown in FIG. 1, FIG. 3 shows a flow image of a lamella of the section of the integrated generator/rectifier of FIG. 2 acting as a generator, viewed in a first direction, FIG. 4 shows a flow image of a lamella of the section of the integrated generator/rectifier of FIG. 2 acting as a generator, viewed in a second direction, FIG. 5 shows the temperature course in the liquid film on a lamella in the generator section of the integrated generator/rectifier of FIG. 2.

The preferred embodiment of an absorption heat pump shown in FIG. 1 has a first circuit for a solution of work medium and solvent, in which a generator 1 and an absorber 3 are arranged, and a second circuit for the work medium in which a condenser 5 and an evaporator 7 are arranged. The solution used is, for example, a mixture of ammonia (work medium) and water (solvent). A first outlet 9 of the generator 1 is connected through a conduit 11 to an inlet 13 of the condenser 5, while an outlet 15 of the evaporator 7 is connected via a conduit 17 to a first inlet 19 of the absorber 3. The condenser 5 has an outlet 21, which is connected through a conduit 23 to an inlet 25 of the evaporator 7. An outlet 27 of the absorber 3 is ultimately connected through a series of conduits 29 to an inlet 31 of the generator 1, while a second outlet 33 of the generator 1 is connected through a conduit 35 to a second inlet 37 of the absorber 3. In the conduits 23 and 35 are arranged an expansion valve 39 and an expansion valve 41, respectively. The heat pump is provided with a transport conduit 43 for a heating liquid, for example water. The water is circulated in the transport conduit 43 by means of a pump 45. Viewed from the pump 45 in the direction of flow of the water, the latter is successively transported to a heating body 47 for room heating, a heat exchanger 49 arranged in the condenser 5, a heat-mass-exchanger 51 arranged in the absorber and again to the pump 45. The conduits 17 and 23 extend in opposite directions of flow through a heat exchanger 53, while the conduits 29 and 35 extend in opposite directions of flow through a heat exchanger 55.

The generator 1 has a vertically arranged circular-cylindrical holder 57, in which a coaxial circular first metal pipe 59 is arranged. The first pipe 59 is closed at its upper end and is passed near its lower end through the bottom of the holder 57 to the outside. A vessel 61 is connected to the lower end of the first pipe 59. Below the vessel 61 is arranged a gas burner 63. To the first pipe 59 is welded a metal fin which consists of a number of interconnected rectangular lamellae 65 wound helically around the first pipe 59. The adjacent lamellae 65 of successive turns of the helical line formed overlap each other in part, viewed in the circumferential (tangential) direction of the first pipe 59 (see also FIGS. 2 and 3). Each of the lamellae 65 is provided with a capillary passage 67, a passage located above the surface of an underlying lamella being in a shifted position with respect to the passage of the underlying lamella. The holder 57 is provided with a finned second metal pipe 69 which is coaxial to the first pipe 59, said second pipe 69 being arranged above the first pipe 59 and being closed at its lower end facing the first pipe 59. The circular second metal pipe 69 surrounds a coaxial circular third pipe 71, which is in communication at its open lower end with a supply 73 for a cooling medium (solution) and is connected at its end passed through the closed upper end of the second metal pipe 69 to an outlet 75 for the cooling medium, which is connected to the conduit 29. The second pipe 69 is passed through the closed upper end of the holder 57. Preferably, the third pipe 71 is thermally insulated or made of a thermally insulating material (not shown). In the space between the holder 57 and the second pipe 69 is arranged a metal fin which consists of a number of interconnected rectangular lamellae 77 helically wound around the second pipe 69. The helical fin constituted by the lamellae 77 is preferably pressed as a whole into the space between the holder 57 and the second pipe 69, an inner edge of the fin engaging the outer surface of the second pipe 69 and an outer edge of the fin engaging the inner surface of the holder 57. The lamellae 65 of the fin wound around the first pipe 59 are arranged so as to be fully clear of the inner wall of the holder 57. The lamellae configuration of the fin wound around the second pipe 69 is entirely identical to that of the fin wound around the first pipe 59 except for the fact that the lamellae 77 of the fin wound around the second pipe 69 do not possess capillary passages. However, this may be the case if the mass pair used provides a reason for it.

The holder 57 has three sections, i.e.: a first section 79, which acts as a generator, a section 81 which acts as a rectifier, and a section 83 which acts as a so-called dephlegmator. For the sake of simplicity, the combinations of the three sections 79, 81 and 83 is designated as a generator 1. In fact, the generator 1 consequently is a generator in which a rectifier and a dephlegmator are integrated. Although the presence of the third section 83 acting as a dephlegmator is to be preferred, in a number of cases this section may also be dispensed with.

The vessel 61 contains a liquid evaporation and condensation medium 85, such as, for example, water. Into the upper part of the first pipe 59 is introduced a quantity of non-condensing gas 87, by which the rectifier action of the section 81 is brought about. The gas 87 may be, for example, nitrogen gas. There is present in the lower part of the holder 57 a quantity of liquid solution 89 of, for example, ammonia (work medium) and water (solvent). By heating of the gas burner 63, a quantity of water in the vessel 61 evaporates. The said water vapour ascends in the first pipe 59 and forms on the comparatively cold inner wall of this pipe a condensate film 91 which extends as far as the rectifier section 81. Due to the force of gravity, the condensate flows downwards and is collected again in the vessel 61. Thus, a continuous cycle of evaporation and condensation is obtained. The combination of the generator section 79 and the vessel 61 constitutes a so-called thermosiphon (a particular form of a heat pipe). Through the wall of the first pipe, heat is transferred with the aid of the condensate film 91 in the generator section 79 to the lamellae 65. A film 93 (see FIGS. 3, 4 and 5) of initially comparatively cold rich solution of ammonia and water is present on these lamellae 65. This solution flows into the generator via the inlet 31 and originates from the absorber 3. By means of a pump 95, a comparatively rich cold solution 97 in the absorber 3 is continuously pumped to the generator 1 via the series of conduits 29. In the first instance, this solution reaches the dephlegmator section 83 and is then conducted via the third pipe 71, which forms part of the series of conduits 29, to the heat exchanger 55 and is there already preheated by comparatively hot poor solution flowing in the conduit 35. The preheated rich solution entering the holder 57 via the inlet 31 falls first on the lamellae 65 of the rectifier section 81, then on the lamellae 65 of the generator section 79 and is collected in impoverished state in the lower part of the holder 57 as a comparatively hot poor solution 89. For the sake of clarity, the operation of the generator section 79 is now first described, after which the operation of the rectifier section 81 and of the dephlegmator section 83 is described.

Due to the comparatively cold rich solution flowing downwards, the aforementioned film 93 is formed on each of the lamellae 65, which film is effectively composed of a comparatively hot lower layer 97 and a cold upper layer 99 (see FIG. 5). Viewed over the thickness of the liquid film 93 on the lamella 65, the temperature increases, as is indicated by an arrow 101. The lamellae 65 are directed slightly downwards with their free ends (radial direction) in order to prevent that an excess quantity of solution flows along the outer wall of the first pipe 59. Due to the helical form, the lamellae 65 are also directed slightly downwards with a longitudinal edge (tangential direction). This orientation of the lamellae 65 is clearly visible in FIGS. 3 to 5. Below the lamellae 65 are formed falling drops 103, which are indicated with reference to four lamellae 65 in FIG. 3 at different stages. The drops 103 fall each time on the film 93 of an underlying lamella 65 beside the capillary passage 67 of the underlying lamella. In FIG. 3, this is indicated with a drop 105 on the lowermost lamella 65. Due to the falling drops 103, an intensive mixing is obtained of the richer comparatively cold upper layer 99 in the film 93 with the already impoverished comparatively hot lower layer 97 so that the temperature increases uniformly throughout the thickness of the film 93 and the concentration of work medium in the film 93 is distributed homogeneously. Thus, a largest possible quantity of ammonia gas is released from the solution flowing downwards. Just in front of the free end and the downwardly directed longitudinal edge of the lamellae 65, drops 107 are formed, which fall on the film 93 of subjacent lamellae. When the drops 103 and 107 fall, already formed hot ammonia gas ascending in the holder 57 flows around these drops, as a result of which an additional quantity of ammonia gas is released from the falling drops. In the rectifier section 81, the ascending hot ammonia gas gets into contact with the still comparatively cold film on the lamellae 65 of this section. As a result, not only an additional quantity of ammonia gas is released, but also the water vapour still present in the ammonia gas is condensed for a considerable part. The condensed water is collected in the lower part of the holder 57 and is mixed there with the impoverished solution 89. The rectifier section is substantially adiabatic because no heat is supplied or dissipated from the outside. The holder 57 is enveloped for this purpose by an insulation sheath (not shown in FIG. 1). The nitrogen gas 87 in the rectifier section 81 has the same pressure as the water vapour in the upper part of the generator section 79. The water vapour in the upper part of the generator section 79 is separated comparatively clearly from the nitrogen gas in the rectifier section 81. The nitrogen gas 87 behaves like an insulator so that the section 81 actually operates automatically as a rectifier (adiabatic). Preferably, a non-condensable gas having a comparatively small diffusion coefficient is used in the rectifier section 81 to minimize heat and mass diffusion in the transitional region between vapour and inert gas and to cause a smallest possible transitional region to be formed. A large transitional region in fact decreases the condensation temperature and hence also the heat transfer in the generator section 79, while at the same time a smaller part of the section 81 acts as an adiabatic rectifier.

In the present case, the rectangular lamellae 65 have a length of 30 mm, a width of 9 mm and a thickness of, for example, 1 mm. The aberage diameters of the pipe 59 and the holder 57 are 60 mm and 125 mm, respectively, while the wall thicknesses are 2.5 mm and 2.5 mm. Due to the pitch angle (0.05 radians) of the helical line formed, the lamellae 65, viewed over their width (tangential direction), are directed downwards (see FIG. 3). Viewed in radial direction, the free ends of the lamellae 65 are also slightly directed downwards (angle of 0.05 radians) as shown in FIG. 4. The vertical distance between two adjacent lamellae is about 9 mm. The capillary passages 67 are situated approximately at the centre (tangential direction) in the front part (radial direction) of the lamellae 65 and have a diameter of 2 mm.

The ascending ammonia gas already cooled in the rectifier section 81 is mostly not yet freed completely from water vapour. Therefore, the ammonia gas is preferably passed further through a dephlegmator, which in the present case is constituted by the dephlegmator section 83. The temperature in the dephlegmator section 83 is lower than the temperature in the rectifier section 81 because the rich solution flowing through the inlet 73 into the second pipe 69 and the third pipe 71 has not yet been preheated in the heat exchanger 55. The solution in the dephlegmator section 83 serves as a cooling medium, which extracts heat from the comparatively hot ammonia gas flowing along the lamellae 77. Substantially the whole quantity of water vapour in the ammonia gas is thus condensed out. The condensate is collected in the lower part of the holder 57 and is mixed with the impoverished solution 89. In the dephlegmator section 83, the contact with the lamellae 77 is an optimum because the latter engage both the inner wall of the holder 57 and the outer wall of the second pipe 69. The lamellae 77 are consequently longer than the lamellae 65. It is essential that the lamellae 65 of the generator section 79 and the rectifier section 81 are arranged so as to be clear of the inner wall of the holder 57 and that the lamellae 77 of the dephlegmator section 83 engage the inner wall of the holder 57. The generator section 79 and the rectifier section 81 act as a heat-mass-exchanger, while the dephlegmator section 83 acts as a heat exchanger. In the dephlegmator section 83, no mass contact occurs between two different media. Preferably, the third pipe 71 in the dephlegmator section 83 is constructed as a thermally insulated pipe (not shown in FIG. 1).

The hot ammonia gas substantially completely freed from water vapour is passed via the first outlet 9 of the holder 57 and the conduit 11 to the condenser 5 and is condensed there whilst transferring heat to the heating liquid in the heat exchanger 49. In the lower part of the condensor 5 there is collected a sufficient quantity of ammonia 109, which is passed via the outlet 21 and the conduit 23 to the evaporator 7 after having been expanded in the expansion valve 39. In the evaporator 7, heat is supplied by means of a heat exchanger 111 to the liquid ammonia, which evaporates thereby. The ammonia gas formed in the evaporator 7 is passed via the outlet 15 and the conduit 17 to the first inlet 19 of the absorber 3. In order to obtain an optimum evaporation in the evaporator 7, the comparatively hot liquid ammonia originating from the condenser 5 is already precooled in the heat exchanger 53 by means of the comparatively cold ammonia gas from the evaporator 7. In the absorber, the heat released during the absorption process is supplied by means of the heat exchanger 51 to the heating liquid in the transport conduit 43. The comparatively hot impoverished solution dissipated via the second outlet 33 from the holder 57 is passed through the pipe 35 to the heat exchanger 55 and gives off heat there to the comparatively cold rich solution originating from the absorber 3. After the heat exchanger 55, the impoverished solution in the pipe 35 is consequently already precooled so that the absorption process can be effected to the optimum. In the expansion valve 41, the pressure of the poor solution is reduced, after which this solution is supplied via the second inlet 37 to the absorber. The poor solution forms a liquid film on the outer side of the heat exchanger 51 and absorbs the ammonia gas supplied via the first inlet 19. It should be noted that the heat-mass-exchanger 51 in the absorber 3 may be replaced by a finned pipe of the kind shown in FIG. 2. The heat- and mass transfer obtained with such a pipe is comparatively high and is based on a mixing process similar to that described with reference to the generator section 79, with the difference that the temperature gradient across the liquid film on a lamella has an opposite direction.

It should be noted that the nitrogen gas used in the rectifier section 81 may be replaced by other gases, such as, for example, hydrogen gas, argon gas or helium gas. The gas used must not be corrosive in relation to the evaporation and condensation medium in the vessel 61 and to the materials of the vessel 61 and of the first pipe 59. Moreover, the gas must not condense at the pressure and temperature prevailing in the pipe 59. As stated, a gas is preferably used having a comparatively low diffusion coefficient.

The dephlegmator section 83 described may be dispensed with when a small quantity of water vapour in the ammonia gas is considered acceptable.

Although the invention is described with reference to a solution of ammonia and water, other solutions usual in absorption heat pumps may also be used. The heating of the vessel 61 may be effected by a gas burner or oil burner. Electrical heating or heating by flue gases is also possible, however. In the vessel 61 may be arranged, for example, a heat exchanger into which flue gases are passed.

A particular advantage of the invention resides in the fact that similar technologies can be used for the manufacture of the generator, the rectifier and the dephlegmator. The manufacture of fins consisting of lamellae can in fact be standardized to a great extent and these fins can be mass-produced in a simple manner and at low cost.

The invention is described with reference to a finned pipe, in which a substantial drop formation takes place near the free ends and the downwardly directed longitudinal edges of the lamellae, but is not limited thereto. The extent to which the said drop formation takes place depends upon a large number of parameters. Important parameters in this connection are:
the liquid flow rate to be processed,
the mass pair used (surface tension/extent of wetting),
the sharpness of the edges of the lamellae,
the value of the angle at which the free ends of the lamellae are directed downwards,
the value of the pitch angle of the helical line,
the diameter of the capillary passages.

For example, in the case of sharp edges of the lamellae and substantially horizontal lamellae, a comparatively small number of drops will be formed near the free ends and the longitudinal edges of the lamellae. The drop formation then takes place mainly below the capillary passages, which process substantially the whole quantity of liquid. In the case of lamellae directed strongly downwards, both kinds of drop formation occur. The drops formed below the capillary passages then slide along the lower side of the lamellae slightly towards the free ends and the longitudinal edges. In practice, it has to be ascertained empirically, which combination of parameters is to be preferred.

Although the invention is described with reference to lamellae 65 which are provided with capillary passages 67 for an optimum mixing process, in a number of cases lamellae without capillary passages are sufficient. Also in these cases, due to the cascade of lamellae already such a mass exchange is obtained that the absorption heat pump has a comparatively high efficiency.

What is claimed is:

1. An absorption heat pump comprising a generator and absorber arranged in a first circuit for a solution of work medium and solvent and a condenser and evaporator arranged in a second circuit for the work medium, an outlet of the generator being connected to the condenser and an outlet of the evaporator being connected to the absorber, which is connected via an outlet to an inlet of the generator, while a vertically arranged first metal pipe passed into a holder of the generator and closed at its upper end is connected at its lower end to a vessel arranged outside the holder and forming part of the generator, which vessel contains an evaporation and condensation medium, respectively, the space between the holder and the said first pipe being connected to a supply for the solution and to an outlet for gaseous work medium, characterized in that the first pipe is filled in an upper rectifying section with a thermally insulating gas and is wetted in a lower generating section adjoining the upper section on its inner wall with condensing work medium, while the pipe is provided both in the upper and in the lower section with at least one fin which is secured to the outer wall of the pipe and is arranged so as to be clear of the inner wall of the holder.

2. An absorption heat pump as claimed in claim 1, characterized in that the holder is provided with a finned second metal pipe, which is coaxial to the first pipe, said second pipe being arranged above the first pipe and being closed at its end facing the first pipe, said second pipe surrounding a coaxial third pipe which is in communication at its open lower end with a supply for a cooling medium and is connected at its open upper end passed through the closed upper end of the second pipe to an outlet for the cooling medium, while the space between the holder and the second pipe is connected near the upper end of the holder to the condenser.

3. An absorption heat pump as claimed in claim 1, characterized in that the metal fin secured to the first pipe consists of a number of interconnected lamellae which are helically wound around the first pipe.

4. An absorption heat pump as claimed in claim 3, characterized in that the lamellae are provided with capillary passages, the adjacent lamellae of successive turns of the helical line formed overlapping each other in part, viewed in the circumferential direction of the first pipe, and the capillary passage located above the surface of an underlying lamella being in a shifted position with respect to the capillary passage of the said underlying lamella.

* * * * *